United States Patent Office 3,652,629
Patented Mar. 28, 1972

3,652,629
NITROGEN CONTAINING POLYMERS
Godfrey Fort, Ardrossan, Scotland, assignor to Imperial Chemical Industries Limited, London, England
No Drawing. Filed Dec. 16, 1969, Ser. No. 885,637
Claims priority, application Great Britain, Dec. 30, 1968, 61,661/68
Int. Cl. C07f 7/02
U.S. Cl. 260—448.2 N                                14 Claims

ABSTRACT OF THE DISCLOSURE

Siloxane-oxyalkylene copolymers containing one or more units having an oxyalkylene block connected to a silicon atom through an N-alkylene carbamyloxy group. The compounds are useful as emulsifiers, dispersing agents, lubricants for fibres and plastics, nonionic surface active agents and latex coagulants.

---

This invention relates to new and useful nitrogen-containing polymers and more particularly to nitrogen-containing siloxane/oxyalkylene copolymers.

According to the present invention a new and useful nitrogen-containing polymer comprises an organopolysiloxane copolymer containing one or more units of the general formula:

$$R_x-\underset{\underset{\frac{4-x-y}{2}}{|}}{\overset{|}{Si}}-\left[R'-\overset{R''}{\underset{|}{N}}-\overset{O}{\underset{||}{C}}-O-\left(C_nH_{2n}-O\right)_z-R'''\right]_y$$

where R is a substituted or unsubstituted monovalent hydrocarbon group, R' is a divalent organic group, R'' is a monovalent hydrocarbon group, R''' is a monovalent hydrocarbon group, an acyl group, a substituted carbamyl group or a divalent group of the general formula

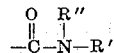

the remaining valency of the group R' being satisfied by another silicon atom in the same or another polysiloxane block, x is 0, 1 or 2, y is 1 or 2, n is 2, 3 or 4 and z is an integer not less than 2 and not greater than 100 the remaining units, if any, in the organopolysiloxane copolymer being of the general formula:

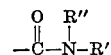 (II)

wnere R is as hereinbefore defined except that a small proportion thereof may be replaced by hydrogen, and b is 0, 1, 2, or 3.

The groups R may be, for example, alkyl, aryl, aralkyl, alkaryl, alkenyl, cycloalkyl or cycloalkenyl groups or such groups containing substituents, for example, such as halogen, cyano groups, ether or ester groups. Suitable groups include, for example, methyl, ethyl, propyl, butyl, phenyl, tolyl, benzyl, phenylethyl, vinyl, allyl, cyclohexyl, chloromethyl, 3-chloropropyl, p-chlorophenyl, 2-cyanoethyl, 2 - cyanopropyl, 3 - cyanopropyl, 4 - cyanobutyl, 3-methoxypropyl and 2 - (ethoxycarbonyl)ethyl groups. It is, however, in general preferred that at least a major proportion of the groups R should be methyl groups.

The divalent organic group R' is preferably an alkylene group having not more than 20 carbon atoms. Suitable alkylene groups include, for example, ethylene, 1,3-propylene, 1,4 - butylene, 2 - methyl - 1,3 - propylene and 1,11-undecylene groups.

The group R'' may be an alkyl, aryl, aralkyl, alkaryl, cycloalkyl, alkenyl or cycloalkenyl group. It may be, for example, a methyl, ethyl, propyl, butyl, phenyl, tolyl, benzyl, cyclohexyl, vinyl, allyl or cyclohexenyl group. It is normally preferred, however, that it be an alkyl group and it is further preferred that it should have not more than 4 carbon atoms.

The group R''' may be a monovalent hydrocarbon group such as an alkyl, aryl, aralkyl, alkaryl, or cycloalkyl group, an acyl group, a carbamyl group substituted on the nitrogen atom by one or two monovalent hydrocarbon groups such as alkyl or aryl groups or a divalent group of the general formula:

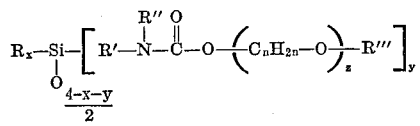

the remaining valency of the group R' being satisfied by another silicon atom in the polysiloxane block or on another polysiloxane block. It is, however, in general preferred that it be a monovalent hydrocarbon group having not more than 10 carbon atoms. Suitable groups include for example, methyl, ethyl, propyl, butyl, phenyl, benzyl, tolyl and cyclohexyl groups.

It is also preferred that in my copolymers there should not be more than two and in many cases it is further preferred that there should be only one polyoxyalkylene block or blocks attached to any one silicon atom. The attachment is in all cases by means of the bridging group

The oxyalkylene units ($C_nH_{2n}O$) may be oxyethylene, oxypropylene or oxybutylene units or a mixture of two or more of these. It is, however, normally preferred to have oxyethylene units with or without oxy-1,2-propylene units.

The ratio of units of Formula II to those of Formula I, in the copolymers of our invention may vary widely. The most useful products however are those in which the ratio is from 0:1 to 100:1. The ratio chosen will depend on the end use for which the copolymer is desired. The products of my invention are capable of use as emulsifiers and dispersing agents in a variety of systems and those copolymers which are rendered water soluble by virtue of their oxyethylene content are especially useful.

In general products with higher siloxane content are useful, for example, as lubricants for fibres and plastics and those with higher polyoxyalkylene contents are useful as nonionic surface active agents, latex coagulants and the like. The preferred copolymers having oxyethylene units alone or with oxy - 1,2 - propylene units are particularly useful as cell control agents and stabilisers in the manufacture of polyurethane foams. They are especially valuable in the manufacture of polyether based polyurethane foams. In general products having a weight ratio of oxy - 1,2 - propylene units to oxyethylene units in the range from 0:1 to 0.4:1 are particularly useful in rigid polyurethane foam manufacture whereas those in which this ratio is from 0.6:1 to 1.5:1 are particularly useful in the manufacture of flexible polyurethane foams. When copolymers of our invention are to be used in the manufacture of polyurethane foams it is preferred that the polyoxyalkylene portion should be within the range of from 50–85 percent by weight of the total. These products are, of course, used in polyurethane foam manufacture in well known manner and may be incorporated by adding separately at the mixing stage or by premixing with one or more of the other ingredients.

The products of my invention have a high degree of hydrolytic and chemical stability. Thus, for example, they can be stored for long periods in aqueous amine solutions of the kind used in the preparation of polyurethane foams or in the isocyanates used in the preparation of polyurethane foams.

This stability is also of value in other applications particularly those in which the copolymers are used in aqueous solutions.

The copolymers of my invention may be produced by reacting an organopolysiloxane containing one or more units of the general formula:

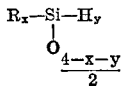

(III)

where R, x and y are as hereinbefore defined, either alone or with one or more other units of the general formula:

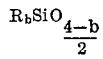

(II)

with an unsaturated polyoxyalkylene carbamate of the formula:

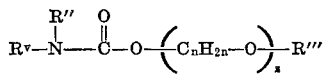

where $R^v$ is the ethylenically unsaturated precursor of $R'$ to give copolymers where $R'''$ is a monovalent hydrocarbon group, an acyl group or a substituted carbamyl group. To obtain copolymers where $R'''$ is divalent the organopolysiloxane may be reacted with a polyoxyalkylene dicarbamate of the general formula:

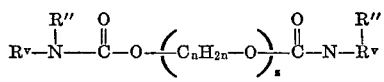

My copolymers can also be obtained by reacting the organopolysiloxane with a mixture of two or more carbamates all of which may or may not all be of the one type. The siloxane used in this process may be linear, cyclic or branched. Particularly useful are the linear organopolysiloxanes having at least one unit of formula (RHSiO) with or without one or more terminal

units. It is, in general preferred that there should not be more than one hydrogen atom attached to any one silicon atom. The siloxane used may also contain one or more branching units $RSiO_{3/2}$, $HSiO_{3/2}$ or $SiO_2$ but these should not be present in amount such as to cause a high degree of branching i.e. there should not be more than 1 branching unit per 10 siloxane units.

My invention is further illustrated by the following examples in which all parts and percentages are by weight except where otherwise stated.

EXAMPLE 1

A solution of 1084 parts of a polyoxyalkylene mono-ol having an average molecular weight of 1670, obtained by oxyalkylating cyclohexanol with ethylene oxide and propylene oxide in the molecular ratio of 1:1, in 434 parts of toluene was dried by azeotropic distillation with return of toluene to the solution. The solution was then heated until the temperature of the liquid had reached 110° C. after which a rapid stream of carbonyl chloride from a weighed cylinder was passed thereinto. Heat was evolved and refluxing of the toluene occurred. The temperature was maintained in the range 114–118° C. and after 2½ hours the weight of carbonyl chloride passed in was 140 parts (i.e. 2.18 times the theoretical amount). The carbonyl chloride flow was stopped and the mixture heated under reflux for 15 minutes. A rapid stream of dry nitrogen was thereafter passed through the hot solution for 20 minutes to remove hydrogen chloride and unreacted carbonyl chloride. The toluene was removed by distillation under reduced pressure (finally at 120° C. at 20 mm. Hg pressure) in a stream of nitrogen. There were thus obtained 1122 parts of an almost colourless, viscous liquid which had no hydroxyl band in the 2.8µ region of its infra-red spectrum.

171 parts of the polyether chloroformate so prepared were dissolved in 200 parts of dry toluene and 265 parts of anhydrous sodium carbonate added thereto. A solution of 12.0 parts of N-n-butylallylamine in 17.5 parts of dry toluene was then added gradually to a mixture over a period of 30 minutes. During the addition the mixture was stirred and the temperature maintained at 25–30° C. by cooling. The stirred mixture was heated at 50° C. for 2.5 hours after which it was cooled and filtered. The solid filtered off was washed with 39 parts of toluene. The filtrate and washings were combined and evaporated under reduced pressure in a stream of nitrogen (finally at 120° C. at 15–20 mm. Hg pressure). There were thus obtained 175 parts (theoretical yield 179 parts) of a pale yellow viscous liquid which was found to contain 0.78 percent nitrogen. The calculated nitrogen content of the N-allyl-N-n-butyl-carbamate of the polyether was 0.78 percent.

71.56 parts of the so prepared polyether N-allyl-N-n-butyl-carbamate and 0.01 part tert-butylcatechol were dissolved in 56.5 parts of toluene and the solution dried by azeotropic distillation with return of the toluene to the solution. A solution consisting of 8.7 parts of toluene and 3.6 parts of a polysiloxane containing 0.147 percent of active hydrogen and having an average composition represented by the formula

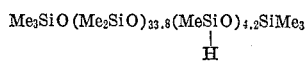

was added rapidly to the stirred, dried, solution while heating under reflux. A solution of 0.01 part of bis(diethylsulphide) platinous chloride in 4.35 parts of toluene was thereafter added over a period of 2.3 hours. The mixture consisted initially of two phases and became clear 1.3 hours after starting to add the platinum catalyst. Heating under reflux and stirring were continued for 1.7 hours with the reaction mixture at 119–120° C. Toluene was distilled off at atmospheric pressure in a slow stream of nitrogen over a period of 1 hour during which time the temperatrue of the mixture rose gradually from 119° C. to 150° C. Heating under nitrogen was continued at 150–155° C. for 1.7 hours. The remaining toluene was then distilled off at 150° C. in a stream of nitrogen the pressure being reduced gradually to 20 mm. Hg. There were thus obtained 100.6 parts of a pale yellow viscous liquid copolymer which was soluble in cold water to give a clear solution.

EXAMPLE 2

64.2 parts of the polyether chloroformate prepared as described in Example 1 were reacted with 3.03 parts of N-methylallylamine by the method described in Example 1 for the reaction with n-butyl allylamine, to give the N-allyl-N-methylcarbamate of the polyether.

52.3 parts of this product were dissolved in 43.5 parts of toluene and the solution dried by azeotropic distillation. During this stage and the subsequent reaction, the mixture was stirred and a slow stream of nitrogen passed thereinto. 18.7 parts of the polysiloxane used in Example 1 dissolved in 13.0 parts of toluene were added to the dried solution and, when reflux had been reestablished, the addition of a solution of 0.015 part of bis(diethyl sulphide) platinous chloride in 8.7 parts of toluene was commenced. The initially cloudy reaction mixture became clear in 2 hours and addition of the platinum catalyst was complete in 2.6 hours. After all the catalyst had been added, heating under reflux was continued for 2.25 hours. The temperature of the reaction mixture was maintained at 118–120° C. throughout the reaction. The toluene was then distilled off at 120° C. under a pressure of 20 mm. Hg in a stream of nitrogen. There were thus obtained 68.3 parts of a clear, viscous liquid copolymer which gave a clear solution in cold water.

EXAMPLE 3

75 parts of the polyether N-allyl-N-methyl-carbamate used in Example 2 and 0.015 part of tert-butyl catechol were dissolved in 56.5 parts of toluene and the solution dried by azeotropic distillation. During this stage and the subsequent reaction the mixture was stirred and a stream of nitrogen passed thereinto. A solution consisting of 26 parts of toluene and 38.1 parts of a polysiloxane containing 0.11 percent of active hydrogen and having an average composition represented by the formula $$Me_3SiO(Me_2SiO)_{76}(MeSiO)_7SiMe_3$$
$$|$$
$$H$$

was then added and when reflux had been established at 120° C. addition of a solution of 0.015 part of bis(diethylsulphide) platinous chloride in 4 parts of toluene was commenced. The mixture became clear and homogeneous in 0.5 hour when about half of the catalyst solution had been added. Thereafter the rate of addition was decreased to a rate such that all the catalyst had been added in 3.7 hours. Reaction was thereafter continued for a further 3 hours at 120° C. A further 0.005 part of bis(diethylsulphide) platinous chloride in 1 part of toluene was added in one portion and the mixture heated at 120° C. for 7 hours. The toluene was distilled off at 120° C. at 20 mm. Hg pressure. There were thus obtained 106 parts of a pale-brown liquid copolymer which was soluble in cold water giving a slightly cloudy solution.

EXAMPLE 4

171 parts of polyether chloroformate prepared as described in Example 1 were reacted with diallylamine by the method described in Example 1 for the reaction with n-butylallylamine to give the polyether N,N-diallylcarbamate.

71.4 parts of the polyether N,N-diallylcarbamate, so prepared, and 0.01 part of tert-butyl catechol were dissolved in 56 parts of toluene and the solution dried by azeotropic distillation. During this stage and the subsequent reaction, the mixture was stirred and a stream of nitrogen passed thereinto.

A solution consisting of 9.7 parts of toluene and 16.0 parts of a polysiloxane containing 0.21 percent of active hydrogen and having an average composition represented by the formula $$Me_3SiO(Me_2SiO)_{15}(MeSiO)_3SiMe_3$$
$$|$$
$$H$$

was added and heating continued. When reflux had been established at 120° C. addition of a solution of 0.01 part of bis(diethyl sulphide) platinous chloride in 4 parts of toluene was started. 1 part of the catalyst solution was added rapidly over a period of 2 minutes and the remainder added more slowly so that addition was complete in 2 hours. The reaction mixture was filtered through a layer of dry diatomaceous earth to remove a small quantity of gel particles after which the toluene was removed from the clear filtrate by distillation at 120° C. at 20 mm. Hg pressure in a stream of nitrogen. 83.4 parts of a clear, pale yellow, liquid copolymer, soluble in cold water were obtained.

EXAMPLE 5

2430 parts of oxyethylated methanol having an average molecular weight of 540 were reacted with 670 parts of carbonyl chloride in a manner similar to that described in Example 1 but at the lower reaction temperature of 70–90° C. The resulting polyether chloroformate contained 5.73 percent of chlorine (calculated chlorine content 5.89 percent) and was converted to the polyether N-allyl-N-methyl carbamate by reaction with N-methyl-allylamine by a method similar to that used to prepare the polyether N-allyl-N-butyl carbamate of Example 1.

41.5 parts of the so prepared polyether N-allyl-N-methylcarbamate were dissolved in 35 parts of toluene and dried by azeotropic distillation in a stream of nitrogen. The solution was cooled to 110° C. There was then added over a period of a few minutes while stirring a solution consisting of 8.7 parts of toluene and 16.9 parts of a polysiloxane containing 0.35 percent of active hydrogen and having an average composition represented by the formula $$Me_3SiO(Me_2SiO)_{35.5}(MeSiO)_{12.5}SiMe_3$$
$$|$$
$$H$$

heating being continued. When reflux had been re-established and the temperature of the reaction mixture had reached 120° C. addition of a solution of 0.01 part of bis(diethylsulphide) platinous chloride in 4.35 parts of toluene was commenced, stirring and passage of nitrogen being continued. The two-phase system became clear 20 minutes after starting the addition when about half of the platinum catalyst had been added. Addition of the catalyst was complete in 2.5 hours and reaction was thereafter continued for 2 hours at 118–120° C. A further 0.0025 part of bis(diethylsulphide) platinous chloride in 0.87 part of toluene was added quickly and heating continued for 6.5 hours at 117–120° C. The toluene was thereafter distilled off under reduced pressure in a stream of nitrogen and there were thus obtained 54.1 parts of a liquid copolymer which gave a clear solution in cold water.

EXAMPLE 6

60.3 parts of a polyether chloroformate prepared as described in Example 5 were converted to the polyether N-allyl-N-n-butylcarbamate by reaction with 12.0 parts of N-n-butyl-allylamine by a method similar to that described in Example 1 for the preparation of the polyether N-allyl-N-butylcarbamate.

67.9 parts of the polyether N-allyl-N-n-butylcarbamate and 0.01 part of tert-butylcatechol were dissolved in 56.5 parts of toluene and the mixture dried by azeotropic distillation. A solution of 25.9 parts of the polysiloxane containing 0.35 percent of active hydrogen as used in Example 5 in 8.7 parts of toluene was added thereto. The two-phase system was stirred at 120° C. under reflux and a stream of nitrogen passed through while a solution of 0.01 part of bis(diethylsulphide) platinous chloride in 4.35 parts of toluene was added. About half of the catalyst solution was added in three minutes and the mixture was then clear and homogeneous. The rate of catalyst addition was then decreased to a rate such that three quarters had been added in 1 hour and addition was complete in 2 hours. Thereafter heating at 120° C. was continued for 2.3 hours after which toluene was distilled off at atmospheric pressure until the temperature of the reaction mixture had risen to 150° C. Heating at this temperature was continued for 1 hour. The pressure was then reduced to 20 mm. Hg and the residual toluene distilled off. There were thus obtained 91.7 parts of a clear pale-brown liquid which gave a clear solution in cold water.

EXAMPLE 7

100 parts of oxypropylated glycerol of average molecular weight 3000, 49.7 parts of a 80:20 mixture of 2,4- and 2,6-tolylenediisocyanate, 4 parts of water, 0.3 part of stannous octoate, 0.08 part of triethylene diamine and 0.3 part of the polysiloxane-oxyalkylene copolymer prepared as described in Example 1 were mixed together. There was thus obtained a resilient polyurethane foam of fine, even texture and density 1.7 lb./cu. ft.

Similar resilient polyurethane foams were obtained when each of the products of Examples 2, 3 and 4 was used in the above process.

EXAMPLE 8

100 parts of oxypropylated trimethylolpropane of average molecular weight 315, 145 parts of crude 4,4'-di-isocyanatodiphenylmethane, 25 parts of trichlorofluoromethane, 0.2 part of dibutyltin dilaurate, 15 parts of tri(beta-chloroethyl)phosphate, 1 part of N,N-dimethylcyclohexylamine and 1 part of the polysiloxane-oxyalkylene copolymer prepared as described in Example 5 were mixed together. There was thus obtained a rigid polyurethane foam of fine, even texture and density 2.8 lb./cu. ft.

A similar rigid polyurethane foam was obtained when the product of Example 6 was used in the above process in place of the product of Example 5.

EXAMPLE 9

The oxyalkylated cyclohexanol of molecular weight 1670 used in Example 1 was converted to its chloroformate ester by treatment at 20–25° C. with 1.8 times the theoretical quantity of carbonyl chloride and distilling off unreacted carbonyl chloride and hydrogen chloride (finally at 80–85° C. at 20 mm. Hg pressure) in a stream of nitrogen. 347 parts of the so prepared polyether chloroformate were added gradually over a period of 2½ hours at 20–25° C. to a stirred mixture of 350 parts of toluene, 30.6 parts of N-cyclohexylallylamine and 106 parts of anhydrous sodium carbonate. The mixture was stirred for a further 2 hours after which it was filtered and volatile matter distilled from the filtrate under reduced pressure in a slow stream of nitrogen (finally at 180° C. at 30 mm. Hg pressure). The residual liquid was redissolved in 350 parts of toluene, 20 parts of an acid fuller's earth ("Fulmont 300C") added and the mixture stirred for 16 hours. Filtration through a layer of diatomaceous earth and removal of volatile material by distillation in a slow stream of nitrogen (finally at 120° C. at 30 mm. Hg pressure) gave the polyether N-allyl-N-cyclohexylcarbamate in the form of a clear, brown, viscous liquid.

A solution of 100 parts of the so prepared polyether N-allyl-N-cyclohexylcarbamate and 33.8 parts of the polysiloxane containing 0.147 percent of active hydrogen used in Example 1 in 87 parts of toluene was stirred and dried by azeotropic distillation with return of the toluene to the solution. The solution was heated to reflux temperature and a solution of 0.02 part of bis(diethylsulphide) platinous chloride in 2.5 parts of toluene added rapidly thereto. The solution became clear within 10 minutes. Heating under reflux was thereafter continued for 5 hours. The toluene was distilled off at 120° C. in a stream of nitrogen, the pressure being reduced gradually to 20 mm. Hg. There were thus obtained 132 parts of a light brown, viscous liquid copolymer which, when tested by the method of Example 7, gave a resilient polyurethane foam of fine, even texture and density 1.7 lb./cu. ft. A similar foam was obtained when the quantity of polysiloxane-oxyalkylene copolymer was reduced to 0.2 part.

EXAMPLE 10

130.5 parts of polypropylene glycol of molecular weight 406 and having the approximate average structure

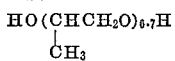

was added gradually over a period of 2 hours at 17–21° C. to a stirred solution of 134 parts of carbonyl chloride in 260 parts of toluene. The resulting solution was maintained at 20° C. for 4 hours. Hydrochloric acid, unreacted carbonyl chloride and toluene were distilled off in a stream of nitrogen. During this stage the temperature was raised gradually to 110° C. and the pressure reduced to 15 mm. Hg, 161.5 parts of polypropylene glycol bis-chloroformate were obtained in the form of a clear, pale liquid. This was found to contain 11.7 percent of chlorine (calculated chlorine content 13.4 percent).

157 parts of the so prepared polypropylene glycol bis-chloroformate were added gradually with stirring at 20–25° C. to a mixture of 350 parts of toluene, 188 parts of anhydrous sodium carbonate and 59.6 parts of anhydrous N-ethylallylamine. The addition took 2 hours and stirring was continued for a further 3 hours. Filtration and removal of volatile material by distillation under nitrogen (finally at 115° C. at 24 mm. Hg pressure) gave polypropylene glycol bis-N-allyl-N-ethyl carbamate in the form of a clear, yellow, viscous fluid containing 4.26 percent nitrogen (calculated nitrogen content 4.47 percent).

A solution of 31.3 parts of the so prepared polypropylene glycol bis-N-allyl-N-ethyl-carbamate and 17.8 parts of 1,1,1,3,5,5,5-heptamethyltrisiloxane in 35 parts of toluene was dried by azeotropic distillation. The solution was maintained under reflux and a solution of 0.01 part of bis(diethylsulphide) platinous chloride in 1.25 parts of toluene added rapidly thereto after which heating under reflux was continued for 5½ hours. The solution was subsequently distilled in vacuo (finally at 160° C. at 1 mm. Hg pressure) to give a clear golden brown liquid residue which showed no SiH absorption in the 4.6μ region of the infrared spectrum.

When tested by the method of Example 8 this product gave a rigid polyurethane foam of fine, even texture and density 2.8 lb./cu. ft.

EXAMPLE 11

108 parts of oxyethylated methanol having an average molecular weight of 540 were dissolved in 130 parts of toluene and the solution dried by azeotropic distillation. The solution was cooled to 20° C., 39.5 parts of dry pyridine and 41.3 parts of N-allyl-N-ethylcarbamyl chloride added with stirring and the resulting solution heated under reflux at 120° C. for 14 hours. Toluene and volatile fractions were removed by heating the final solution up to 140° C. at 20 mm. Hg pressure and after filtration, heating further at 140° C. at 0.7 mm. The crude polyether N-allyl-N-ethylcarbamate was thus obtained in the form of a clear brown liquid which showed no absorption by the carbonyl group of the carbamyl chloride in the 5.75–5.80μ region of the infrared spectrum. A strong absorption band in the 5.9μ region indicated carbamate carbonyl groups and a weak hydroxyl absorption at 2.80μ indicated the presence of some unchanged polyether.

A mixture of 32.5 parts of the so prepared crude polyether N-allyl-N-ethylcarbamate and 9.9 parts of the polysiloxane containing 0.35 percent of active hydrogen used in Example 5 was dried by azeotropic distillation with 40 parts of toluene. 0.024 part of bis(diethylsulphide) platinous chloride was added to the mixture and stirring and heating under reflux continued for 6 hours. The clear reaction mixture was distilled up to a temperature of 160° C. at 25 mm. Hg pressure whereby there was obtained as residue, a water soluble haze, brown viscous fluid. When tested by the method of Example 8 the product gave a rigid polyurethane foam of fine, even texture and density 2.8 lb./cu. ft.

EXAMPLE 12

The chloroformate ester of oxyalkylated cyclohexanol which was used in Example 9 was converted to the N-ethyl-N-methallylcarbamate ester by reaction with N-ethyl-methallylamine by the method used in Example 9 for the reaction with N-cyclohexylallylamine.

64.8 parts of the so prepared polyether N-ethyl-N-methallylcarbamate ester was then reacted with 19.5 parts of the polysiloxane containing 0.147 percent of active hydrogen used in Example 1. The procedure was the same as that described in Example 9 for reacting the same polysiloxane with the polyether N-allyl-N-cyclohexylcarbamate. 83.0 parts of a liquid copolymer were obtained which, when tested by the method of Example 7, gave a resilient polyurethane foam of fine texture and density 2.0 lb. per cu. ft.

EXAMPLE 13

The chloroformate ester of oxyalkylated cyclohexanol used in Example 9 was converted to the N-3-butenyl-N-ethylcarbamate by reaction with N-ethyl-3-butenylamine by the method used in Example 9 for the reaction with N-cyclohexylallylamine.

112.5 parts of the so prepared polyether N-3-butenyl-N-ethylcarbamate were then reacted with 33.8 parts of the polysiloxane containing 0.147 percent of active hydrogen used in Example 1. The procedure was as described in Example 9 for reacting the same polysiloxane with the polyether N-allyl-N-cyclohexylcarbamate. 144.5 parts of a liquid copolymer were obtained which, when tested by the method of Example 7, gave a resilient polyurethane form of fine, even texture and density 1.7 lb./cu. ft. A similar foam was obtained when the quantity of polysiloxane oxyalkylene copolymer was reduced to 0.2 part.

EXAMPLE 14

824 parts of oxyethylated methanol having an average molecular weight of 824 were melted by heating to 35–40° C. 109 parts of carbonyl chloride were passed therein gradually with stirring during 1 hour while cooling to maintain the temperature in the range 30–40° C. After reacting for a further 2 hours at 30–40° C. the infrared spectrum of a sample of the reaction mixture showed, by the absence of the hydroxyl band in the 2.8µ region, that reaction was complete. Unreacted carbonyl chloride and hydrogen chloride were then distilled off in a stream of nitrogen (finally at 80–85° C. at 20 mm. Hg pressure) to give the polyether chloroformate in the form of a colourless liquid.

The polyether chloroformate was converted to the polyether N-allyl-N-ethylcarbamate by reaction with 1.1 times the calculated quantity of N-ethylallylamine by the method described in Example 9 but using a lower distillation temperature of 120° C. instead of 180° C. The N-allyl-N-ethylcarbamate of oxyethylated methanol was obtained in the form of a colourless, viscous liquid.

74.5 parts of the polysiloxane containing 0.35 percent of active hydrogen used in Example 5 were dissolved in 65 parts of toluene and the solution dried by azeotropic distillation. The solution was cooled to 100° C. while passing a stream of nitrogen therethrough and 0.005 part of bis(diethylsulphide) platinous chloride in 2 parts of toluene added rapidly. 8.33 parts of styrene were then added over a period of 15 minutes. After heating under reflux for 2 hours the reaction mixture (A) was cooled.

Meanwhile a solution of 191 parts of oxyethylated methanol N-allyl-N-ethyl carbamate prepared as above in 173 parts of toluene was dried azeotropically and 0.010 part of bis(diethylsulphide) platinous chloride in 2 parts of toluene was added rapidly. The toluene solution (A) prepared above and containing the polysiloxane modified by reaction of styrene with about 30 percent of the SiH groups to give phenylethyl groups attached to silicon was added over a period of 30 minutes to the stirred solution of the polyether carbamate while heating under reflux which was continued for 5 hours. 0.005 part of bis(diethylsulphide)platinous chloride in 2 parts of toluene was added and the reaction continued under reflux for 3 hours. The solution was distilled up to 115° C. at 20 mm. Hg pressure whereby there was obtained a pale, clear liquid which changed to a soft waxy solid at 20° C. The infra-red spectrum showed only a trace of SiH absorption in the 4.6µ region and the nuclear magnetic resonance spectrum showed approximately the expected ratio of phenyl groups to methyl groups bonded to silicon. When tested by the procedure of Example 8 the product gave a rigid polyurethane foam of fine, even texture and density 2.8 lb./cu. ft.

EXAMPLE 15

A polyoxyalkylene mono-ol having an average molecular weight of 1670 obtained by oxyalkylating n-butanol with ethylene oxide and propylene oxide in the molecular ratio of 1:1 was converted to its chloroformate ester by reaction with 1.9 times the theoretical quantity of carbonyl chloride by the method used in Example 9 for preparation of the chloroformate ester of oxyalkylated cyclohexanol. 1299 parts of the chloroformate ester were converted to the polyether N-allyl-N-ethyl carbamate ester by reacting with 75 parts of the aqueous azeotrope of N-ethylallylamine (containing 11 percent of water) by the method used in Example 9 for preparation of the N-allyl-N-cyclohexylcarbamate of oxyalkylated cyclohexanol but using a temperature of 120° C. instead of 180° C., to remove the volatile material. 116 parts of the polyether N-allyl-N-ethylcarbamate were reacted with 35.2 parts of the polysiloxane containing 0.147 percent of active hydrogen used in Example 1 by the method used in Example 9 to prepare a product based on the N-allyl-N-cyclohexylcarbamate of oxyalkylated cyclohexanol but employing as catalyst 0.015 part of chloroplatinic acid dissolved in 0.5 part of isopropanol in place of bis(diethylsulphide) platinous chloride. The copolymer obtained was a brownish, viscous liquid and when tested by the procedure of Example 7 gave a resilient polyurethane foam of fine even texture and density 1.6 lb./cu. ft. When 0.2 part of the copolymer was used instead of 0.3 part a similar foam was obtained with a density of 1.7 lb./cu. ft.

EXAMPLE 16

82.4 parts of the oxyethylated methanol chloroformate used in Example 5 were added over a period of 2 hours with stirring to a mixture of 20.0 parts of N-allylaniline, 87 parts toluene and 26.5 parts of anhydrous sodium carbonate maintained at 75–85° C. Thereafter the mixture was stirred for 3 hours at 75–85° C. and filtered through a layer of diatomaceous earth. Toluene was distilled from the filtrate at 120° C. at 20 mm. Hg pressure and then residual allylaniline was distilled off at 130° C. at 1 mm. Hg pressure. The polyether N-allyl-N-phenyl-carbamate was obtained in the form of a clear, brown liquid. The absence of an absorption band in the 3µ region of the infrared spectrum showed that all allylaniline had been removed. 83.5 parts of polyether N-allyl-N-phenylcarbamate were reacted with 30.3 parts of the polysiloxane used in Example 5 employing the procedure used in Example 5 for reaction of the polyether N-allyl-N-methyl-carbamate. The solvent-free copolymer was obtained in the form of a brownish viscous liquid which dissolved completely in cold water and became semi-solid on standing. When tested by the procedure of Example 8 the copolymer gave a rigid polyurethane foam of fine, even texture and density 2.7 lb./cu. ft.

EXAMPLE 17

337 parts of the oxyalkylated cyclohexanol used in Example 1 were added over a period of 3½ hours at 2 to 7° C. with stirring to a solution of 133.4 parts of carbonyl chloride in 390 parts of toluene. Thereafter the temperature of the reaction mixture was allowed to rise to 20° C. and the mixture then left overnight. Unreacted carbonyl chloride, hydrogen chloride and toluene were removed by blowing with nitrogen at 50° C. at atmospheric pressure and then distilling at 70° C. in a stream of nitrogen at 20 mm. Hg pressure. The polyether chloroformate obtained as a liquid residue was found to contain 1.88 percent chlorine (calculated chlorine 2.05 percent).

140 parts of the so prepared polyether chloroformate were added over a period of 2 hours at 20° C. with stirring to a mixture of 11.3 parts calcium oxide, 156 parts of toluene and 10.9 parts of N-ethylallylamine/water azeotrope of water content 11 percent. Thereafter the reaction was continued at 50° C. for 2 hours with stirring. The mixture was then filtered through a layer of diatomaceous earth and volatile materials distilled off at 115° C. at 22 mm. Hg pressure. There was thus obtained the polyether N-allyl-N-ethyl-carbamate in the form of a clear, pale-yellow liquid which was found to contain 1.12 percent of nitrogen (calculated nitrogen 0.95 percent) and less than 0.1 part per million of calcium.

130 parts of the so prepared polyether N-allyl-N-ethyl carbamate, 121 parts of toluene and 57.7 parts of the polysiloxane containing 0.11 percent active hydrogen used in Example 3 were stirred and water removed azeotropically. The dried solution was heated under reflux and a solution of 0.03 part of bis(diethylsulphide) platinous chloride in 4 parts of toluene added over a period of 2 hours with stirring. The mixture was then heated under reflux for a further 5 hours. A further 0.01 part of bis (diethylsulphide)platinous chloride dissolved in 2 parts of toluene were then added rapidly and the mixture heated under reflux for a further 6 hours. An infrared spectrum of the reaction mixture after this showed only a slight absorption band due to SiH in the 4.6µ region. Distillation of the toluene up to 120° C. at 20 mm. Hg pressure left a pale-brown liquid copolymer which gave a clear solution in water at 10° C. When 0.3 or 0.2 part of the copolymer was used in the procedure of Example 7 resilient polyurethane foams of fine, even texture and density 1.7 lb./cu. ft. were obtained.

EXAMPLE 18

A solution of 96 parts of the polyether N-allyl-N-ethyl carbamate prepared from oxyethylated methanol of average molecular weight 824 as described in Example 14 was dissolved in 165 parts of toluene and the solution dried by azeotropic distillation. While passing a stream of nitrogen to exclude air the solution was cooled to 90° C. 0.019 part of bis(diethyl sulphide) platinous chloride was added rapidly with stirring followed by 99 parts of a polysiloxane containing 0.084 percent of active hydrogen and having an average composition represented by the formula

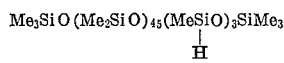

Me$_3$SiO(Me$_2$SiO)$_{45}$(MeSiO)$_3$SiMe$_3$
            |
            H

Addition of the polysilaxane was completed in 2 minutes and a clear, one phase reaction mixture was obtained 2 to 3 minutes later. The reaction mixture was heated under reflux for 2½ hours at 117° C. and then distilled to remove volatile material (finally at 120° C. at 1 mm. Hg pressure). There was then obtained a liquid copolymer which changed to a soft, wavy solid on standing at 20° C.

The copolymer was shown to be useful as a textile fibre lubricant by dissolving in cold water to give a stable, opalescent solution of 5 percent concentration and apply to 70 denier, continuous filament, polyester yarn to give a 0.7 percent uptake of copolymer after drying off the water at 20° C. Coefficients of friction were measured at 25° C. against two samples of chrome steel and two samples of ceramic material. The results obtained are given in the table below.

| Speed (ft./min.) | Chrome steel | | Ceramic material | |
|---|---|---|---|---|
| | Sample A | Sample B | Sample A | Sample B |
| 100 | 0.14 | 0.40 | 0.29 | 0.21 |
| 1,000 | 0.22 | 0.48 | 0.31 | 0.245 |

The treatment also gave low fibre/fibre friction and excellent anti-static protection during processing and handling.

What I claim is:

1. An organopolysiloxane copolymer comprising one or more units of the general formula:

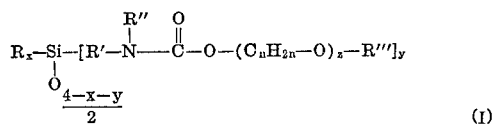

$$R_x-Si-[R'-N-\overset{O}{\overset{\|}{C}}-O-(C_nH_{2n}-O)_z-R''']_y$$
$$\underset{\frac{O_{4-x-y}}{2}}{|}$$
(I)

wherein R is a substituted or unsubstituted monovalent hydrocarbon group selected from the groups consisting of alkyl, aryl, and aralkyl; R' is an alkylene group having up to 20 carbon atoms; R'' is a monovalent hydrocarbon group selected from the groups consisting of alkyl, aryl, cycloalkyl and alkenyl, R''' is alkyl, cycloalkyl or a group of the general formula

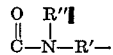

$$\overset{O}{\overset{\|}{C}}-N-R'-$$
       |
       R'' wherein the remaining valency of the group R' being occupied by another silicon atom in the same or another polysiloxane block, x is 0, 1 or 2, y is 1 or 2, n is 2, 3 or 4 and z is an integer not less than 2 and not greater than 100 the other remaining units, if any, in the organopolysiloxane copolymer being of the general formula:

$$R_b-Si-O_{\frac{4-b}{2}}$$
(II)

where R is as defined above, except that a small proportion thereof may be replaced by hydrogen, and b is 0, 1, 2 or 3.

2. An organopolysiloxane copolymer according to claim 1 wherein at least a major proportion of the groups R are methyl groups.

3. An organopolysiloxane copolymer according to claim 1 wherein the group R' is an alkylene group containing not more than 20 carbon atoms.

4. An organopolysiloxane copolymer according to claim 3 wherein the group R' is selected from the group consisting of ethylene 1,3 - propylene, 1,4 - butylene, 2-methyl-1,3-propylene, and 1,11-undecylene groups.

5. An organopolysiloxane copolymer according to claim 1 wherein the group R'' is an alkyl group having not more than 4 carbon atoms.

6. An organopolysiloxane copolymer according to claim 1 wherein the group R''' is a monovalent hydrocarbon group having not more than 10 carbon atoms.

7. An organopolysiloxane copolymer according to claim 6 wherein the group R''' is selected from the group consisting of methyl, ethyl, propyl, butyl, vinyl, benzyl, tolyl and cyclohexyl groups.

8. An organopolysiloxane copolymer according to claim 1 wherein the oxyalkylene units ($C_nH_{2n}O$) are selected from the group consisting of oxyethylene, oxypropylene and oxybutylene units and mixtures of two or more of these.

9. An organopolysiloxane copolymer according to claim 8 wherein the oxyalkylene units are oxy-1,2-propylene units and oxyethylene units in one of the ranges 0:1 to 0.4:1 and 0.6:1 to 1.5:1.

10. An organopolysiloxane copolymer according to claim 1 wherein the polyoxyalkylene portion forms from 50 to 85 percent by weight of the total.

11. A process for the production of an organopolysiloxane copolymer as claimed in claim 1 comprising reacting an organopolysiloxane containing one or more units of the general formula:

$$R_x-Si-H_y$$
$$\underset{\frac{O_{4-x-y}}{2}}{|}$$
(III)

wherein R, x and y are as defined in claim 1, either alone or with one or more other units of the general formula:

$$R_b-Si-O_{\frac{4-b}{2}}$$
(II)

wherein R and b are as defined in claim 1, with an unsaturated polyoxyalkylene carbamate of the formula:

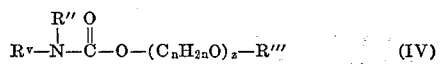

$$R^v-N-\overset{O}{\overset{\|}{C}}-O-(C_nH_{2n}O)_z-R'''$$
       |
       R''
(IV)

wherein $R^v$ is the ethylenically unsaturated precursor of R' which is defined in claim 1 and R'', R''', n and z are as defined in claim 1.

12. A process for the production of an organopolysiloxane copolymer as claimed in claim 1 comprising reacting an organopolysiloxane containing one or more units of the general formula:

wherein R, $x$ and $y$ are as defined in claim 1, either alone or with one or more other units of the general formula:

wherein R and $b$ are as defined in claim 1, with a polyoxyalkylene dicarbamate of the general formula:

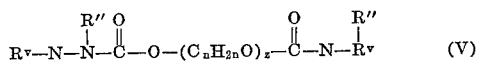

wherein $R^v$ is the ethylenically unsaturated precursor of $R'$ and $R'$, $R''$, $n$ and $z$ are as defined in claim 1.

13. A process according to claim 11 wherein the organopolysiloxane has at least one unit of the formula: HRSiO with or without one or more terminal units of the formula: HRSiO.

14. A process according to claim 11 wherein the organopolysiloxane used contains one or more branching units selected from the group consisting of $RSiO_{3/4}$, $HSiO_3$ and $SiO_2$.

References Cited

UNITED STATES PATENTS 3,249,586   5/1966   Halaska ---------- 260—448.2 N

JAMES E. POER, Primary Examiner

W. F. W. BELLAMY, Assistant Examiner

U.S. Cl. X.R.

260—448.2 E, 2.5 AM